United States Patent [19]

Signal et al.

[11] Patent Number: 5,361,950
[45] Date of Patent: Nov. 8, 1994

[54] CARRYING DEVICE

[76] Inventors: Noel W. Signal, 325 Kapiti Road, Paraparaumu; James R. M. Darling, 30 Kotari Road, Days Bay, Eastbourne, Wellington, both of New Zealand

[21] Appl. No.: 59,624

[22] Filed: May 10, 1993

Related U.S. Application Data

[63] Continuation of Ser. No. 973,417, Nov. 9, 1992, abandoned.

[30] Foreign Application Priority Data

Nov. 8, 1991 [NZ] New Zealand ............ 240527

[51] Int. Cl.⁵ ............................................. A45F 4/00
[52] U.S. Cl. .................................. 224/151; 224/42.42; 224/42; 224/43; 248/311.2
[58] Field of Search .......... 224/42.42, 148, 42.45 R, 224/151, 253, 42.46, 42.01, 42.44; 248/311.2, 214, 690; 206/217, 806; 220/738, 741, 482, 481, 754, 756, 757, 759

[56] References Cited

U.S. PATENT DOCUMENTS

| D. 226,623 | 4/1973 | Shuford | D7/620 |
|---|---|---|---|
| D. 306,544 | 3/1990 | Anderson | D7/620 |
| 1,915,958 | 6/1933 | Skirrow | 248/300 |
| 2,628,054 | 2/1953 | Fazakerley | 248/311.2 |
| 4,401,245 | 8/1983 | Zills | 224/148 |
| 4,557,452 | 12/1985 | Khuong | 248/214 |
| 4,655,425 | 4/1987 | Wallace et al. | 248/311.2 |
| 4,708,273 | 11/1987 | Grant | 224/252 |
| 4,767,092 | 8/1988 | Weatherly | 248/311.2 |
| 4,779,831 | 10/1988 | Anderson | 248/311.2 |
| 4,802,602 | 2/1989 | Evans et al. | 220/739 |
| 4,865,237 | 9/1989 | Allen | 224/42.45 R |
| 4,951,910 | 8/1990 | March | 248/311.2 |
| 4,957,254 | 9/1990 | Hill et al. | 248/207 |
| 4,993,611 | 2/1991 | Longo | 224/148 |
| 5,042,770 | 8/1991 | Louthan | 248/311.2 |
| 5,048,734 | 9/1991 | Long | 248/148 |

FOREIGN PATENT DOCUMENTS

| 216880 | 1/1958 | Australia . |
| 545776 | 8/1985 | Australia . |
| 0176241A1 | 4/1986 | European Pat. Off. . |
| 320794A2 | 6/1989 | European Pat. Off. . |
| 0433543A2 | 6/1991 | European Pat. Off. . |
| 2566720 | 1/1986 | France . |
| 1-317839 | 12/1989 | Japan . |
| 2-169339 | 6/1990 | Japan . |
| 127321 | 5/1963 | New Zealand . |

OTHER PUBLICATIONS

"Auto Performers", 1 page brochure—undated.

Primary Examiner—Glenn T. Barrett
Attorney, Agent, or Firm—Willian Brinks Hofer Gilson & Lione

[57] ABSTRACT

The invention is directed to a carrying device capable of being supported on the inside of a vehicle door by the door, the door being of the type having a window opening with a window sill and a window glass set in a channel in the sill. The carrying device has a body having, or being capable of having attached thereto, a carrying part enabling an article, which is preferably at least one container for holding food or drink, to be carried thereby. The carrying device also has a substantially rigid tongue and an elongated flexible connector connecting the tongue and the body. In use of the device, the tongue is slid down into the inner side of the channel alongside the window glass to be releasably retained in the channel with the connector draped over the window sill and the body hanging down adjacent the inside of the door. The flexible connector allows the device to be used in vehicles having different widths of window sill.

35 Claims, 7 Drawing Sheets

CARRYING DEVICE

This is a continuation application of my previous application Ser. No. 07/973,417 filed Nov. 9, 1992 and now abandoned. The disclosure of the above-mentioned application is incorporated herein by reference.

FIELD OF THE INVENTION

The present invention relates to a carrying device. The carrying device has been devised particularly for use with vehicles such as cars and particularly for use in carrying a container or containers of food or drink though it is not restricted to such uses.

BACKGROUND OF THE INVENTION

An occupant of a vehicle, whether that be the driver or passenger, may wish to eat and/or drink in the vehicle. This presents the problem of where to put food and drink containers and packages in the vehicle when these are not being held so as to minimize the risk of droppages and spillages. This problem is greatest for the driver when the vehicle is being driven but does still exist for the driver and passengers even when the vehicle is stationary.

Some vehicles have or provide places upon which an occupant can place food and drink. For example, many modern cars have an area of their dashboards shaped to be suitable for placing containers and packages of food and drink thereon. However, such places may be inadequate in size and location depending on the number and location of the occupants of the vehicle. Furthermore, such places are rarely satisfactory for supporting containers of drink while the vehicle is moving.

In the past, separate carrying devices have been made which are capable of being supported on the inside-of a vehicle door by the door itself. Usually it is possible to have at least one such carrying device supported by each door of the vehicle. The carrying devices are designed to carry food containers and packages of food and drink and minimize the risk of droppages and spillages, even when the vehicle is moving. These types of carrying devices may be provided by fast food retail outlets.

A known carrying device (U.S. Design Pat. No. 226,623) has a body capable of carrying an object such as a container or package of food or drink. A fairly rigid hook arm projects from the body to enable the device to be releasably hooked onto the sill of a window in a door of the vehicle. The hook arm has a lateral portion which rests on the sill and a downwardly turned tongue at the free end which is slid alongside the window glass into the inner side of the channel in the sill within which the window glass is housed. It is desirable that the length of the lateral portion of the hook arm be such that the body of the device rests or can rest against the inside of the door. A problem arises in that different vehicles can have doors with different distances between the window channel and the inside of the door. If the lateral portion of the hook arm is longer than this distance, then the body of the device does not rest against the inside of the door bum is held clear of it. This means that the engagement of the device with the door is less secure and the body of the device is much more likely to be knocked or to bounce around, especially when the vehicle is moving. If the length of the lateral portion is too short then it is not possible to hook the device to the sill at all. It was with these problems in mind that the present invention was devised.

SUMMARY OF THE INVENTION

The present invention is directed to a carrying device capable of being supported on the inside of a vehicle door by the door, said door being of the type having a window opening with a window sill and a window glass set in a channel in the sill. The carrying device has a body having, or being capable of having attached thereto, carrying means enabling an article, which is preferably at least one container for holding food or drink, to be carried thereby. The carrying device also has a substantially rigid tongue and an elongated flexible connector connecting the tongue and the body. In use of the device, the tongue is slid down into the inner side of the channel alongside the window glass to be releasably retained in the channel with the connector draped over the window sill and the body hanging down adjacent the inside of the door.

The preferred connector is a flexible strap which preferably comprises a series of pivotally connected segments.

Furthermore, the preferred strap is formed from a plastic material and the segments are connected by plastic hinges. This allows the preferred carrying device to have the tongue, the strap and the body integrally molded from a plastic material.

DETAILED DESCRIPTION OF THE PRESENTLY PREFERRED EMBODIMENTS

The carrying device of FIGS. 1 to 7 is designed particularly for releasably mounting to the inside of a car door and for receiving and carrying a container of liquid such as a drink container of the type commonly used by fast food retail outlets for soft drinks and milkshakes. Two different sizes of drink container 10 carried by the device 12 are shown by the dashed outlines in FIG. 5.

Figure 5:
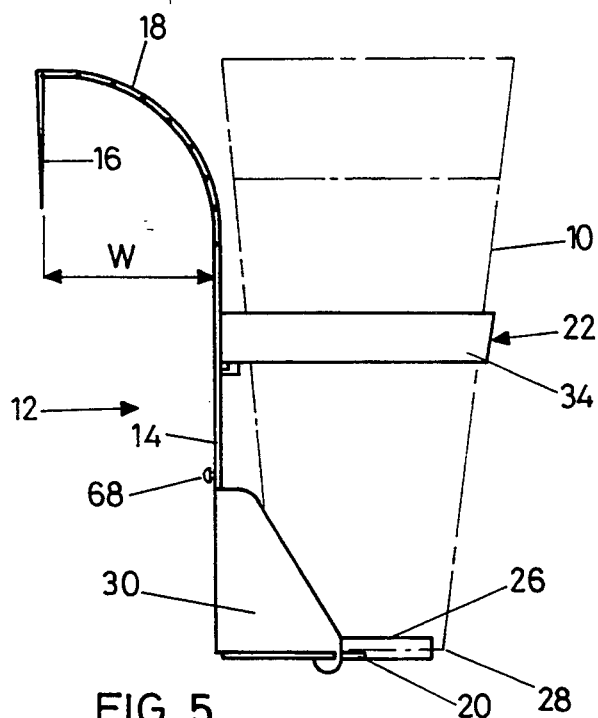
FIG. 5 shows a side view of the carrying device.
Figure 6:
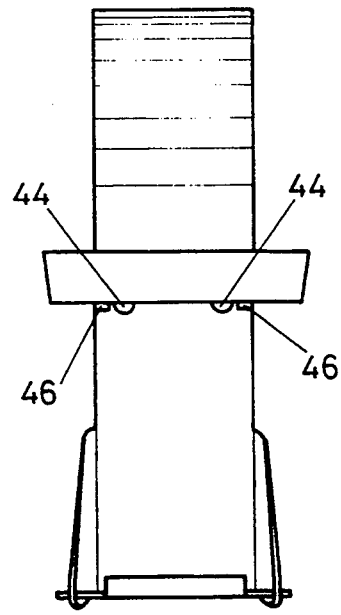
FIG. 6 shows a front view of the carrying device.
Figure 7:
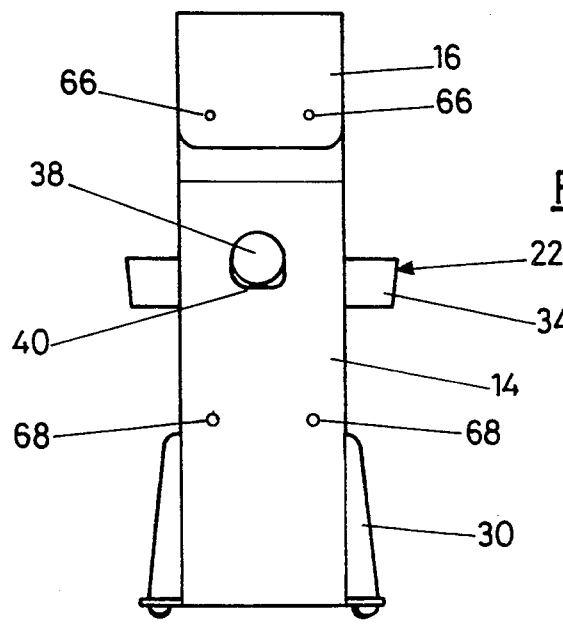
FIG. 7 shows a rear view of the carrying device.

The preferred carrying device of FIGS. 1 to 7 has a substantially rigid body 14, a substantially rigid tongue 16 and an elongated flexible connector in the form of a strap 18 connecting an end of the tongue with the upper end of the body. The body has, or is capable of having attached to it, carrying means to enable an article such as the drink container 10 to be carried by the body. In the embodiment of the carrying device shown in FIGS. 1 to 7, the carrying means comprises a base support 20 and an upper support 22. In this carrying device, the base support 20 is integral with the body whereas the upper support 22 is made separately from the body but is attached to the body to complete the carrying device. Both the base support and the upper support project forwardly from the body and therefore project away from the vehicle door (not shown) which supports the carrying device in use. The upper support is spaced above the base support which is located at the lower end of the body. The upper support 22 has an aperture 24 in it through which the drink container 10 can be placed so that the base of the drink container rests on the base support 20 as shown in FIG. 5. The upper support provides support for the pare of the drink container which is located within the aperture.

For increased stability of a drink container carried by the carrying device, the base support preferably has centering means. In the carrying device=shown in FIGS. 1 to 7, the centering means comprises a low, upwardly-projecting ring 26 designed :o fit within the downwardly projecting base rim 28 usually found at the base of drink containers used by fast food outlets.

At each side of the lower end of the body 14 there is a wing mender 30. The wing members project forwardly from the body 14 and are attached to both the body and the base support 20 to give extra strength to the base support. As best shown in FIGS. 1, 2, 3 and 6, the wing members, in projecting forward from the body, are preferably angled outwardly slightly with respect to each other, either side of the centering ring 26. This angling of the wing members accommodates the tapered shape of the usual drink container. It also helps the wing members direct the base of the drink container onto the base support, and over the centering ring when present, when the drink container is being placed into the carrying device. Thus, the wing members also have a centering function and provide some lateral stability to the base of the drink container.

Figure 12:
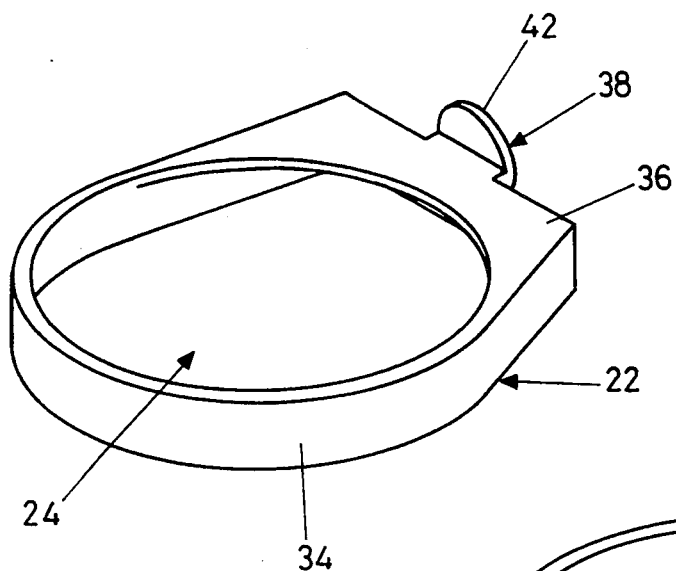
FIG. 12 shows a front perspective view of the preferred upper support used with the carrying device of FIGS. 1 to 7.
Figure 13:
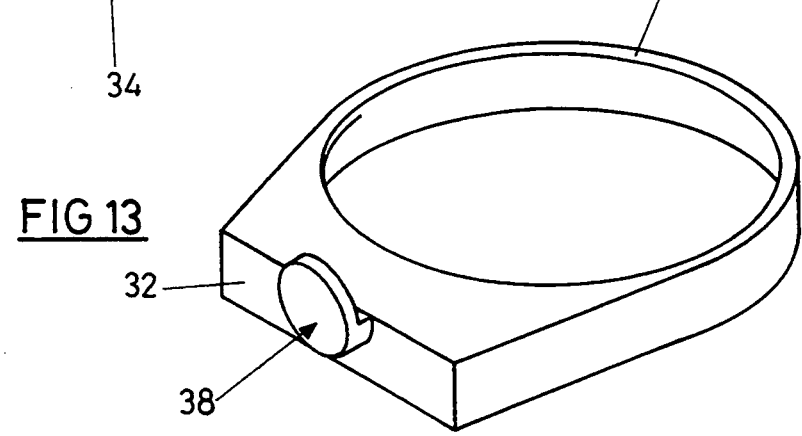
FIG. 13 is a rear perspective view of the upper support.

Referring to FIGS. 12 and 13 which show the separately made upper support 22, this support has a back 32 from which an arcuately formed band 34 projects forwardly. This band, together with a shaped surface portion 36 adjacent the back 32 define the aperture 24 in the upper support. In the embodiment illustrated, the aperture is circular but it can have other shapes, depending on the shape of the container or other article to be placed therethrough in use.

Figure 14:
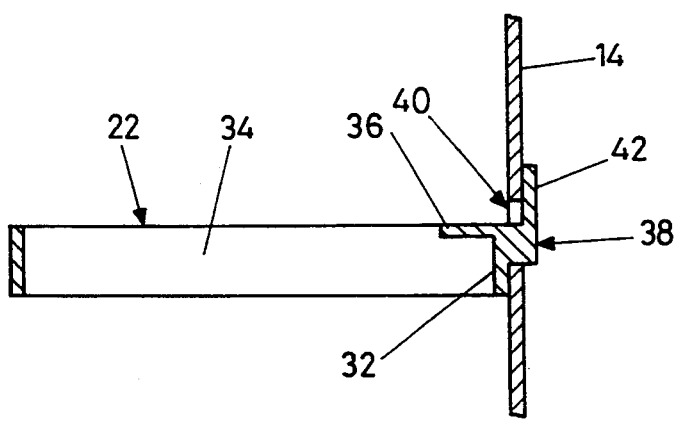
FIG. 14 is a cross-section showing one form of attachment of the upper support to the body of the carrying device.
Figure 16:
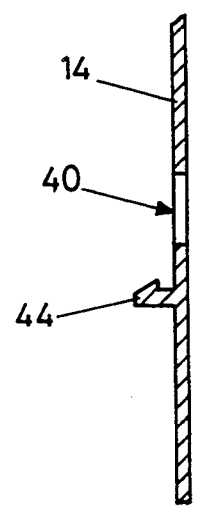
FIG. 16 is a cross-sectional view through part of the body of the carrying device showing a detail of the preferred clip used to complete the attachment of the upper support to the body.
Figure 15:
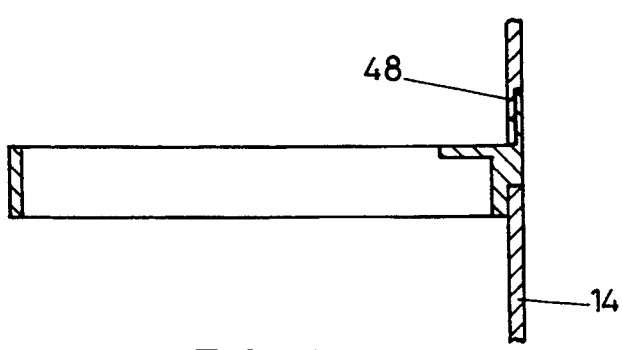
FIG. 15 is a cross-sectional view showing a modified embodiment of attachment of the upper support to the body of the carrying device.
Figure 17:
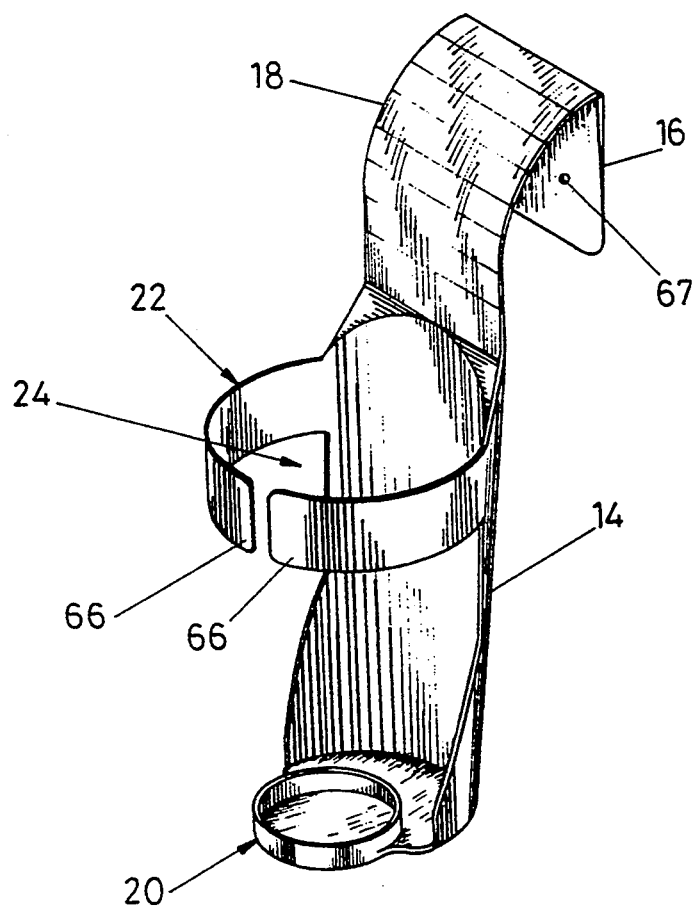
FIG. 17 shows a front perspective view of a third preferred embodiment of carrying device ready for use.
Figure 23:
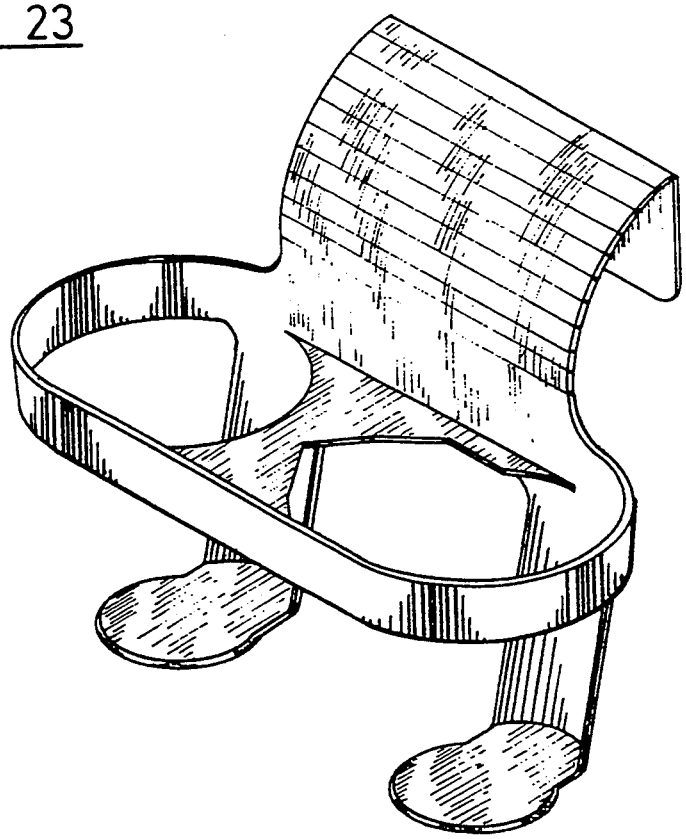
FIG. 23 shows a front perspective view of a fourth preferred embodiment of carrying device ready for use.
Figure 18:
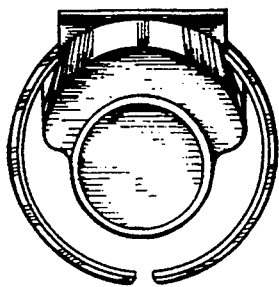
FIG. 18 shows a top view of the carrying device of FIG. 17.
Figure 19:
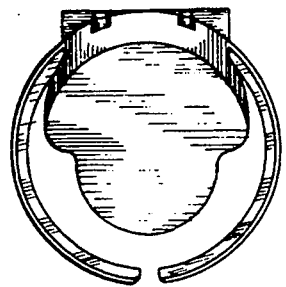
FIG. 19 shows a bottom view of the carrying device of FIG. 17.
Figure 20:
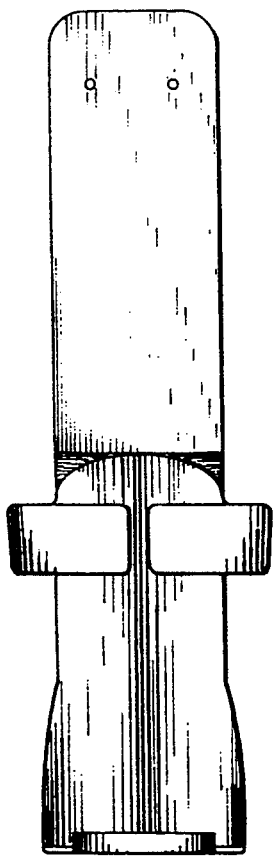
FIG. 20 shows a front view of the carrying device of FIG. 17 but with the tongue and strap straightened.

From the back 32 of the upper support 22, a stepped lug 38 projects rearwardly and upwardly. To attach the upper support to the body 14 of the carrying device, the upper support is manipulated so that the lug is passed through an appropriately sized and shaped aperture 40 in the body to assume the position shown in FIG. 14 where the upwardly projecting portion 42 of the lug 38 is engaged behind the body of the carrying device. It can be seen that on pulling on the upper support while rotating it clockwise, the lug 38 can be disengaged from the aperture 40 and the upper support thereby separated again from the body. To prevent this from happening inadvertently, the body has at least one, and preferably two, resilient clips 44. A cross-section through one of these is shown in FIG. 16. For clarity, no clip 44 is shown in FIGS. 14 and 15 but with upper support 22 in position as shown in FIGS. 14 and 15, the clip or clips 44 snap-fit around the lower edge of the back 32 of the upper support. With sufficient force applied, the clip or clips can be deflected downwardly to allow a deliberate release of the upper support from the body.

The preferred body has at least one, and preferably two, stop menders 46, there preferably being one of these adjacent each clip 44. Each stop member projects forwardly from the body and bears against the lower edge of the back 32 of the upper support. The weight of the upper support thereby tends to be carried by one or more stop members 46 in preference to being carried by the one or more clips 44.

The manner of connecting the upper support 22 to the body 14 shown in FIG. 15 is the same as in FIG. 14 except that the upwardly projecting portion 42 of the lug 38 has approximately half the thickness of the body and fits within a recess 48 in the back of the body. The depth of the recess is about half the thickness of the body so that the back of the lug is substantially flush with the back of the body. Of course many other known forms of attachment could be used to attach the upper support to the body—either permanently or detachably.

As has been mentioned, the preferred connector comprises a flexible strap 18. The preferred strap comprises a series of pivotally connected segments 50. The segments are preferably made of a substantially rigid material so that while the strap can bend in one plane it has little ability for being bent in other planes. This provides the strap with lateral stability in use. One end of the strap is pivotally connected to the upper end of the body 14 whereas the other end of the strap is connected by a pivotal connection to the substantially rigid tongue 16. By "substantially rigid" as used in this specification it is mean that there is sufficient rigidity in the material for the components made therefrom to maintain their general shape and function in use. The presence of some degree of resilient flexibility will not usually matter and may even be desirable.

The tongue 16 may have a sharpish edge at its free end 52 or is preferably tapered towards its free end. In use, the tongue 16 is pushed to slide down alongside the window glass into the inner side of the window channel in the sill of a vehicle door (not shown). Often there may be a seal, such as a rubber seal, or a pad between the window glass and the inside of the window channel in which case the tongue is slid down between the window glass and that seal or pad. This arrangement works for an opening-type window bun will also work for a permanently closed window provided that there is sufficient depth in the window channel to receive the tongue. When the tongue is pushed into the window channel, the strap 18 is draped over the inner part of the window sill so that the body of the device hangs down adjacent, and preferably against, the inside of the vehicle door. The flexible nature of the strap means that its shape can adapt to the shape of the inner sill and can also adapt to the width W (see FIG. 5) of the inner sill. For many makes of car this width is about 50 mm. For other makes of car the width is about 70 mm. Yet other makes of car have other widths. It is desirable that the one carrying device be capable of being used with most, if not all, makes of car.

It is desirable that the shape of the tongue and material from which it is made such that when it is fitted in the window channel an opening window can be opened and closed without undue movement of the tongue and, in particular, without dislodging the tongue from the channel. If necessary, the tongue can be held down by hand when an open window is being closed to prevent it from being dislodged.

The preferred strap 18 is formed from a suitable plastic material, such as polypropylene, for example, with the pivotal connections being provided by plastic hinges 54. This means that the strap can be molded with the plastic hinges formed by grooves in the rear or underside, or even in the front or upper side, of the strap. It is preferable that the tongue, the strap and the body are all integrally molded from a plastic material so that the pivotal connections between the strap and the tongue and between the strap and the body are also provided by plastic hinges formed at the same time.

Figure 10:
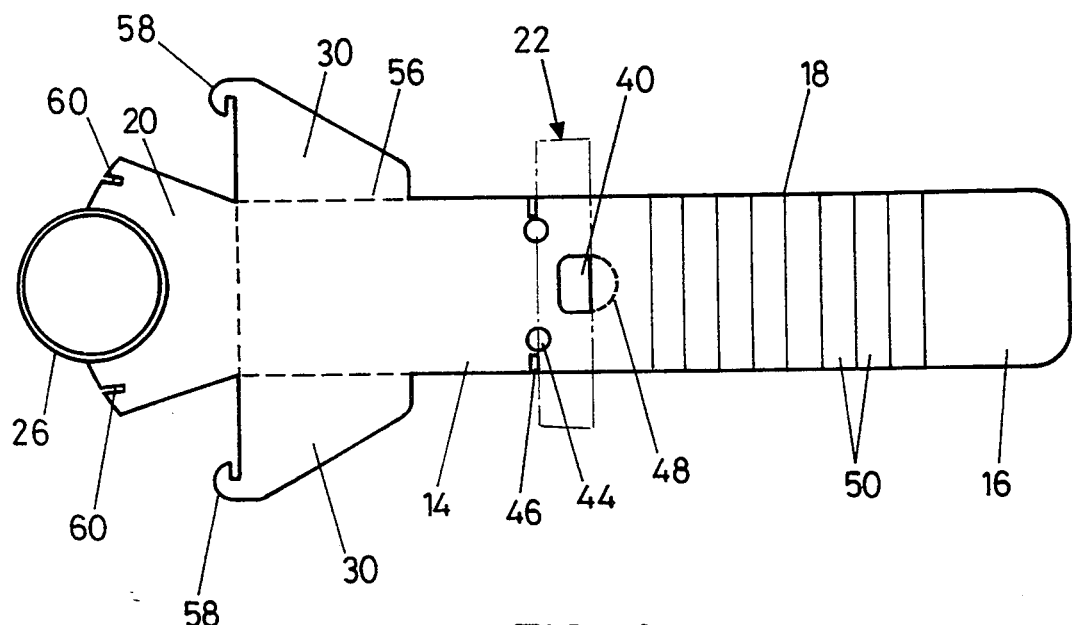
FIG. 10 shows the blank form used in forming the carrying device of FIGS. 1 to 7.

The preferred carrying device shown in FIGS. 1 to 7, is made from a molded plastic, substantially planar, blank form as shown in FIG. 10 to which an upper support 22 as shown in FIGS. 12 and 13 is attached. As shown in FIG. 10, the base support 20 and the wing members 30 comprise flaps attached to the body at fold lines 56. These fold lines also preferably comprise plastic hinges. Each wing member 30 has a hook member 58 at its lower outer end and the base support 20 has a slot 60 each side of the centering ring 26. When these flaps are folded forwardly, the hook menders of the wing members engage the respective slots of the base support to hold it in its forwardly projecting position.

An advantage of making the device from a substantially planar blank form and a separate upper support is that many of these components can be packed for transportation elsewhere with little waste space.

Figure 8:
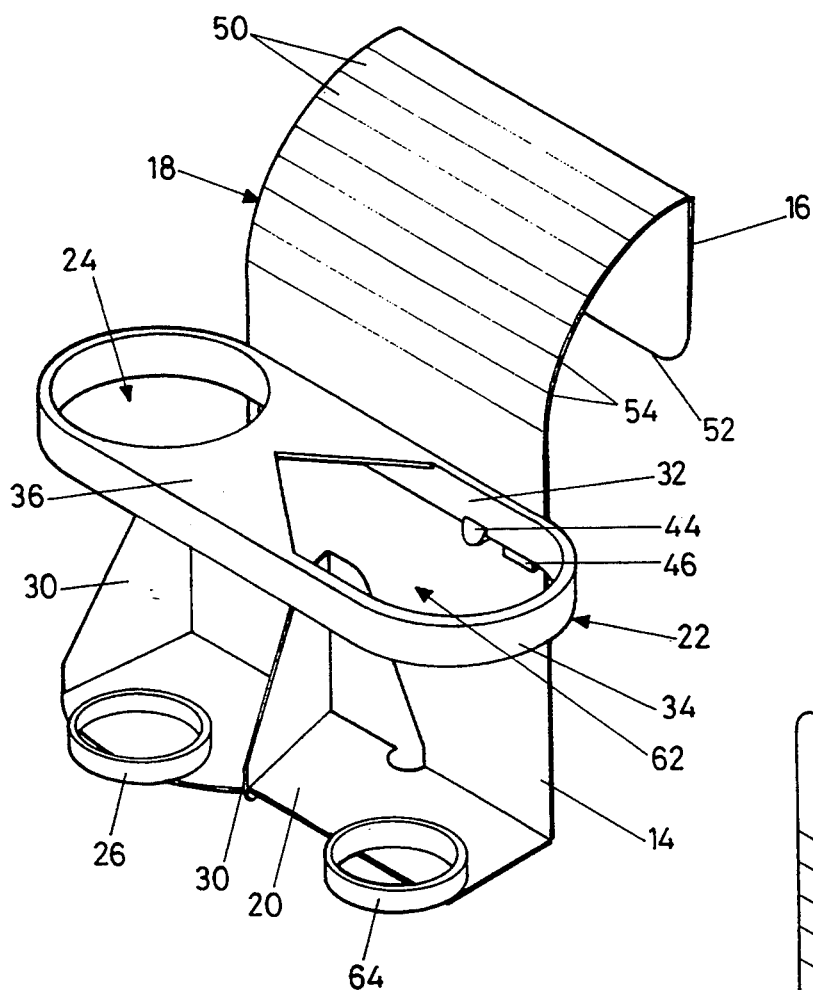
FIG. 8 shows a front perspective view of a second preferred embodiment of carrying device ready for use.
Figure 9:
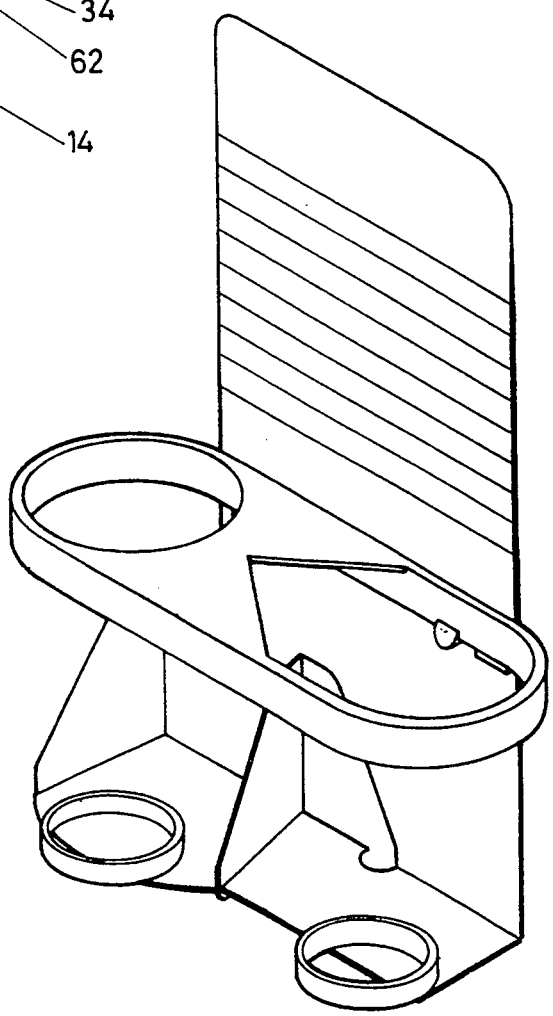
FIG. 9 shows a front perspective view corresponding to that of FIG. 8 but with the tongue and strap of the carrying device straightened.
Figure 11:
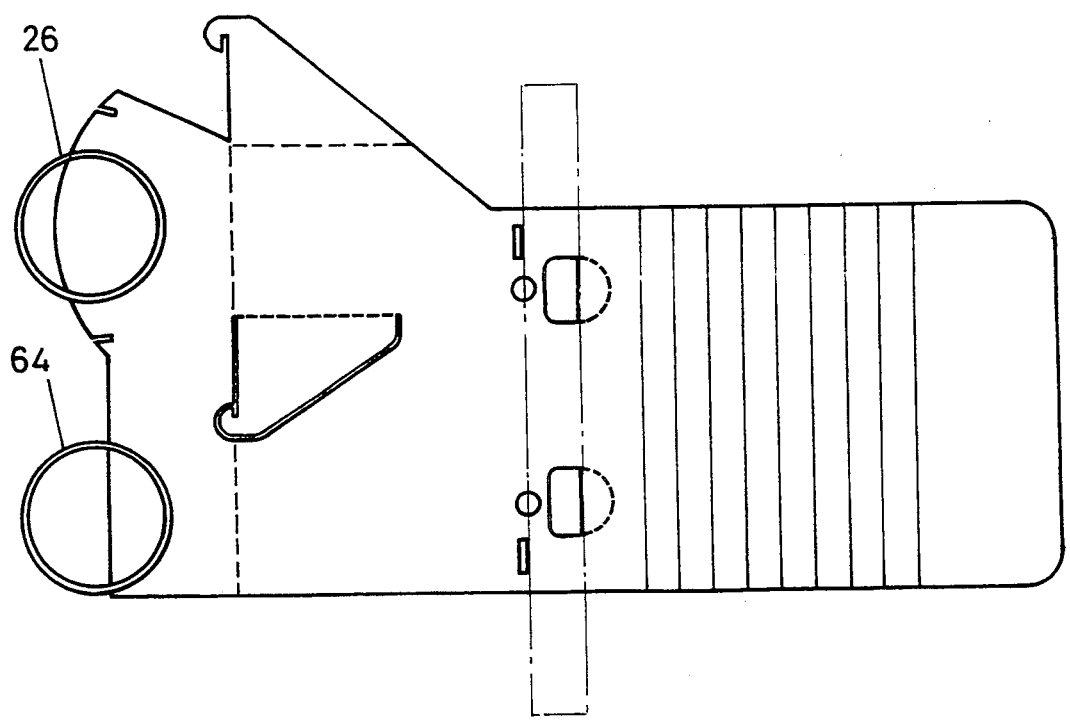
FIG. 11 shows the blank form used in forming the carrying device shown in FIGS. 8 and 9.

FIGS. 8 and 9 show a second preferred embodiment of the carrying device and FIG. 11 shows the blank form which is used to make that carrying device. This carrying device is made wider in order to be able to carry not only a drink container but also another container, for example, a container of potato chips or fries. The upper support 22 is therefore elongated and has a second aperture 62 in it through which the container of chips is passed. The base support 20 is also extended so as to provide support for the base of the chip container. A second ring 64 can be provided to help locate the base of the chip container. The shape of the second aperture 62 is preferably made to correspond with the shape of the chip container.

Figure 1:
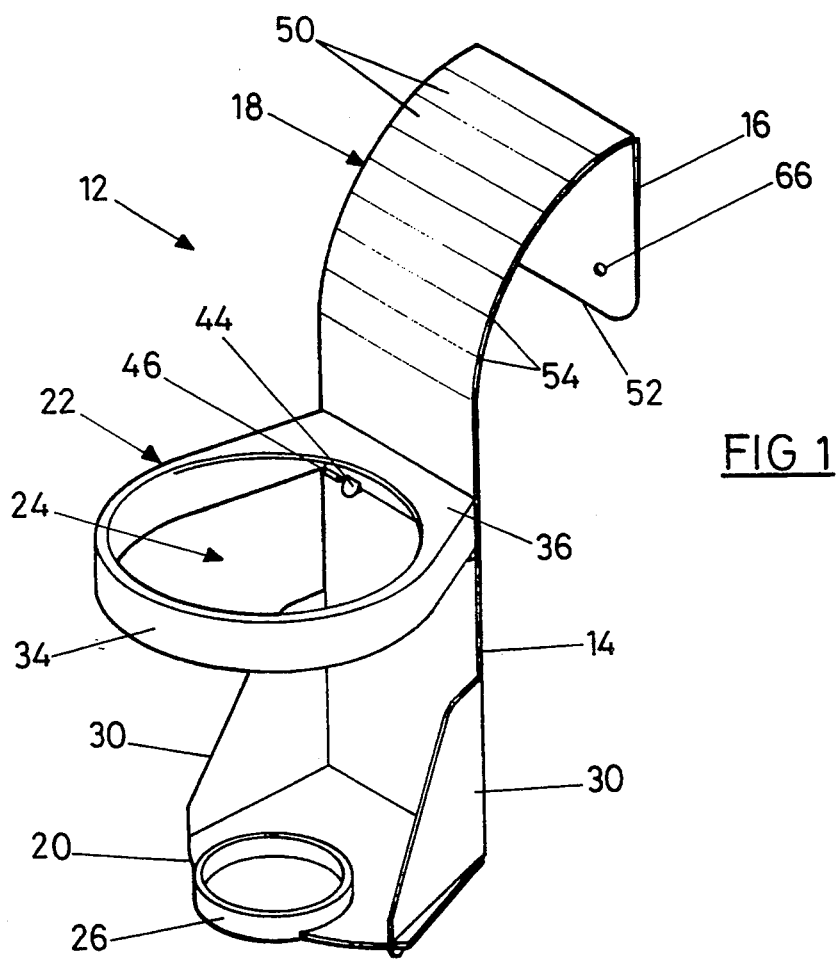
FIG. 1 shows a front perspective view of a first preferred embodiment of carrying device ready for use.
Figure 2:
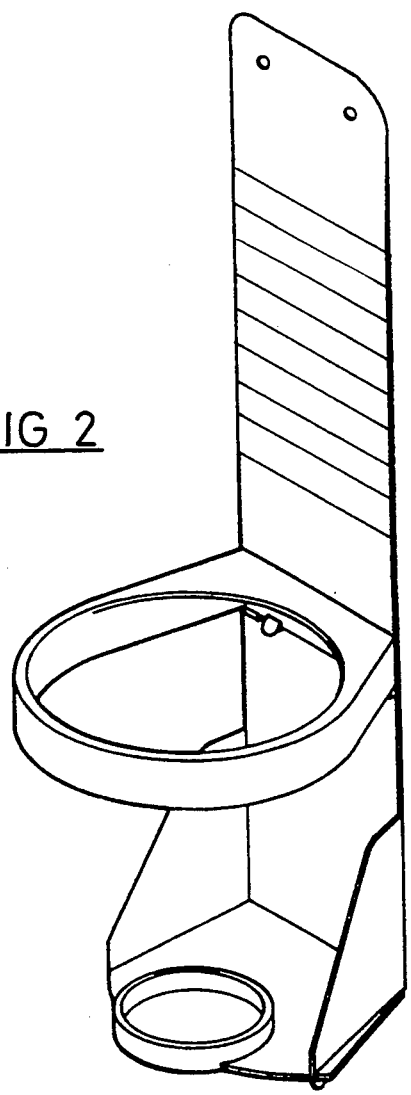
FIG. 2 shows a perspective view corresponding to that of FIG. 1 but with the tongue and strap of the carrying device straightened.
Figure 3:
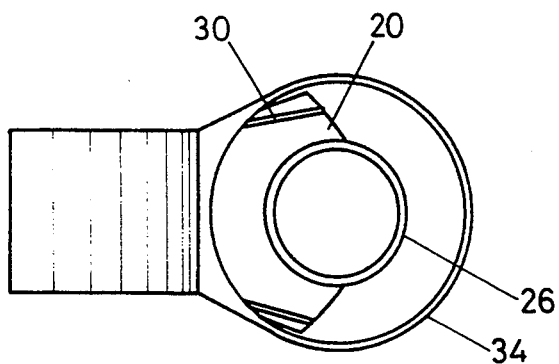
FIG. 3 shows a top view of the carrying device.
Figure 4:
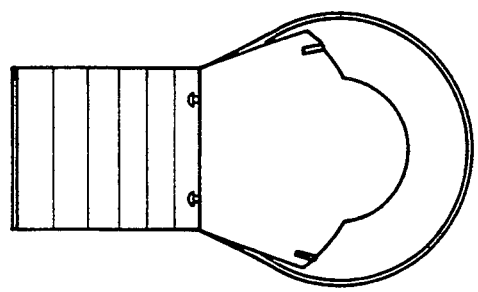
FIG. 4 shows a bottom view of the carrying device.

The embodiment of the carrying device shown in FIGS. 17 to 22 has the tongue, strap, and the body, including the carrying means, all integrally molded from a plastic material such as polypropylene. A feature of this embodiment is that the upper support 22 comprises two arms 66 instead of the band 34 which is shown in FIG. 1. The arms may have a degree of resilient flexibility sufficient to allow larger containers to be placed in the aperture 24 by forcing the arms a little further apart.

Figure 21:
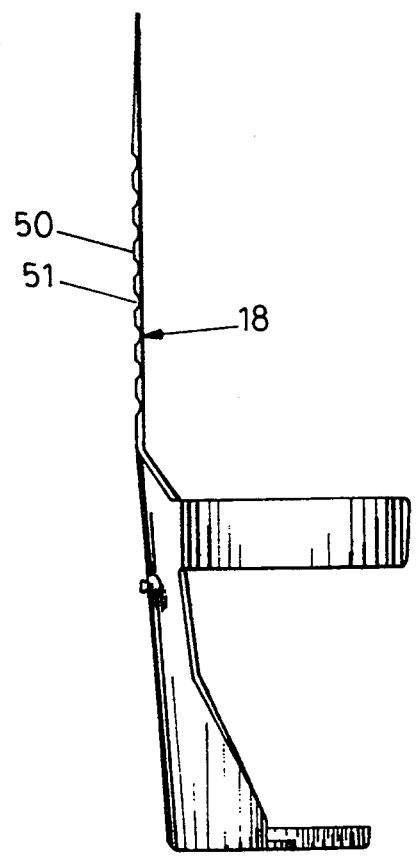
FIG. 21 shows a side view of the carrying device shown in FIG. 20.
Figure 22:
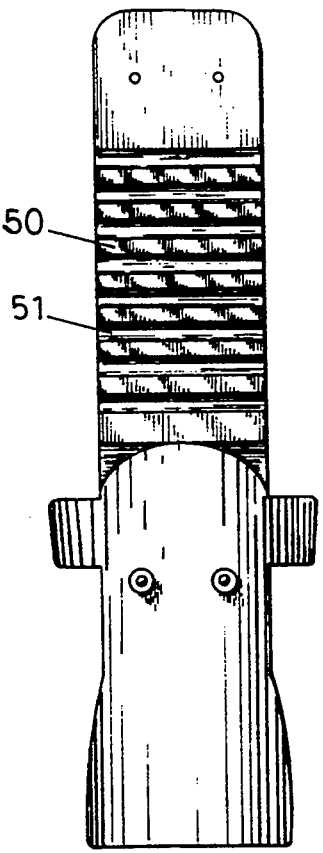
FIG. 22 shows a rear view of the carrying device shown in FIG. 20.

Details of a preferred strap 18 are shown in FIGS. 21 and 22. By way of example, the strap may have a width of about 50 mm. The segments 50 of the strap are located on its rear side and are separated by grooves 51. Again by way of example, the strap in the region of the segments can have a thickness between 1 and 2 mm whereas the thickness in the region of the grooves is much thinner, perhaps 0.05 to 0.2 mm, depending on the nature of the plastics material used to make the carrying device and the degree of flexibility required for the strap. It is not absolutely necessary to have the strap in segmented form. However, the segments help reinforce the strap, help prevent it form twisting, and add to its eye appeal.

Where segments are provided, they can have a width of about 5 mm. The grooves too can have a similar width. In the strap shown in FIG. 21 the sides of the segments are bevelled and the shape of the grooves is substantially the inverse of the shape of the segments. In this case, the base width of each segment may be about 6 mm and the base width of each groove may be about 4 mm. These dimensions are given only by way of example.

The above has described several preferred embodiments or forms of the carrying device of the present invention and has indicated some possible modifications to these but other modifications and forms of the invention can be made without departing from its scope as defined in the claims.

The carrying device can be made to have any suitable size and shape depending on its intended function and it can be adapted for carrying articles other than those relating to food and drink. With embodiments where the upper support is a separate member, different types of upper support can be attached to the body. In another embodiment, even the base support can be made as a separate member attachable to the body. Other forms of attachment than those described with reference to FIGS. 14 and 16 can be used. Furthermore, totally different forms of carrying means can be used from those described and illustrated so far. For example, the body can have a shelf attached or attachable to it or it can have a hook or hooks attached or attachable so as to enable things to be hung from the body within the vehicle.

While the preferred carrying device is made, preferably molded, from a suitable plastic material, it can be made from other materials. For example, a carrying device can be made from a tough cardboard having fold lines where appropriate.

The strap can be made from materials different from the body and the tongue. For example, the strap could be made from a fully flexible material such as a fabric. However, this would not provide the same sideways stability as the preferred type of strap though a leather strap could be better. Instead of a strap, the connector could comprise one or more ties but again there may be a problem with the stability of the body and carrying means in use of the device. Wire ties could provide reasonable stability.

The advantage of the present invention over the known prior art is that the one carrying device can be made which is suitable for use with vehicles having different relevant dimensions across their window sills. However, the device can be used in other situations, when appropriate; in other words the device is not limited to use with vehicles.

In one modification the device can be made so that it is capable of being carried on a belt and worn at the waist of a person. In the embodiments of FIGS. 1 to 5 and FIGS. 17 to 22, for example, the tongue 16 has eyelets 66 which, when the strap 18 is bent back against the body 14, can releasably snap-fit onto domes 68 with slightly expanded heads located on the back of the body 14. The body, strap and tongue thus form a loop through which a belt can pass.

What is claimed is:

1. In a carrying device comprising a body having carrying means for carrying an article, and a support extending from an upper part of the body, the improvement comprising:

the support including a flexible connector to releasably support the device from a window sill of a window opening in a vehicle door, the flexible connector being configured such that it can be doubled back on itself; and a fastener for fastening the flexible connector when it is doubled back on itself to form a belt loop for alternatively supporting the device from a user's belt.

2. The carrying device of claim 1 wherein the fastener comprises a releasable snap fastener.

3. The carrying device of claim 1 wherein the carrying device is integrally molded from a plastic material.

4. The carrying device of claim 3 wherein the fastener comprises a releasable snap fastener integrally molded with the carrying device.

5. The carrying device of claim 3 wherein the flexible connector comprises a series of pivotally connected segments terminating in a pivotally connected substantially rigid tongue.

6. The carrying device of claim 5 wherein the fastener comprises a releasable snap fastener, part of which is integrally molded in the tongue and a coacting part which is integrally molded with the body of the device so that the tongue can be snap fastened to the body of the device to form the belt loop.

7. The carrying device of claim 6 wherein the part of the snap fastener integrally molded in the tongue comprises an eyelet and the coacting part of the snap fastener integrally molded with the body of the device comprises a projecting dome having an expanded head over which the eyelet can be snap fitted.

8. The carrying device of claim 1 wherein:
the carrying device further comprises a container holder;
the body comprises a back member having an upper end from which the flexible connector extends; and
the carrying means comprises a base extending substantially laterally from a lower end of the back member to support a container thereon and an upper support which is adapted to substantially encircle the container when it is supported by the base.

9. The carrying device of claim 8 wherein the upper support comprises two arms extending from the back and which, together, substantially encircle the container.

10. The carrying device of claim 9 wherein the arms are resiliently flexible.

11. The carrying device of claim 8 wherein the device is adapted to carry two containers, each being supported on a base and each being substantially encircled by an upper support.

12. The carrying device of claim 8 wherein the device is integrally molded from a plastic material.

13. The carrying device of claim 12 wherein the fastener comprises a releasable snap fastener integrally molded with carrying device.

14. The carrying device of claim 12 wherein the flexible connector comprises a series of pivotally connected segments terminating in a pivotally connected substantially rigid tongue.

15. The carrying device of claim 14 wherein the fastener comprises a releasable snap fastener, part of which is integrally molded in the tongue and a coacting part which is integrally molded with the body of the device so that the tongue can be snap fastened to the body of the device to form the belt loop.

16. The carrying device of claim 15 wherein the part of the snap fastener integrally molded in the tongue comprises an eyelet and the coacting part of the snap fastener integrally molded with the body of the device comprises a projecting dome having an expanded head over which the eyelet can be snap fitted.

17. The carrying device of claim 8 wherein the carrying device comprises a drink holder for carrying a drink container.

18. An improved carrying device capable of being suspended on an inside of a vehicle door, said door having a window opening with a window sill and a window glass set in a channel in the sill, said carrying device comprising a body having carrying means for carrying an article and a flexible connector extending from an upper part of the body, wherein the improvement consists in the flexible connector having:

a strap releasably connected to an inner side of the channel alongside the window glass whereby the device is suspended from the window sill on the inside of the door; and a fastener for securing the strap to the body for alternatively forming a belt loop whereby the device is suspended from a user's belt.

19. The carrying device of claim 18 wherein the fastener comprises a releasable snap fastener.

20. The carrying device of claim 18 wherein the carrying device is integrally molded from a plastic material.

21. The carrying device of claim 20 wherein the fastener comprises a releasable snap fastener integrally molded with the carrying device.

22. The carrying device of claim 21 wherein the flexible connector comprises a series of pivotally connected segments terminating in a pivotally connected substantially rigid tongue.

23. The carrying device of claim 22 wherein the fastener comprises a releasable snap fastener, part of which is integrally molded in the tongue and a coacting part which is integrally molded with the body of the device so that the tongue can be snap fastened to the body of the device to form the belt loop.

24. The carrying device of claim 23 wherein the part of the snap fastener integrally molded in the tongue comprises an eyelet and the coacting part of the snap fastener integrally molded with body of the device comprises a projecting dome having an expanding head over which the eyelet can be snap fitted.

25. The carrying device of claim 18 wherein:
the carrying device further comprises a container holder;
the body comprises a back member having an upper end from which the flexible connector extends; and
the carrying means comprises a base extending substantially laterally from a lower end of the back member to a support container thereon and an upper support which is adapted to substantially encircle the container when it is supported by the base.

26. The carrying device of claim 25 wherein the upper support comprises two arms extending from the back and which, together, substantially encircle the container.

27. The carrying device of claim 26 wherein the arms are resiliently flexible.

28. The carrying device of claim 25 wherein the device is adapted to carry two containers, each being supported on a base and each being substantially encircled by an upper support.

29. The carrying device of claim 25 wherein the device is integrally molded from a plastic material.

30. The carrying device of claim 29 wherein the fastener comprises a releasable snap fastener integrally molded with the carrying device.

31. The carrying device of claim 29 wherein the flexible connector comprises a strap comprising a series of pivotally connected segments terminating in a pivotally connected substantially rigid tongue.

32. The carrying device of claim 31 wherein the fastener comprises a releasable snap fastener, part of which is integrally molded in the tongue and a coacting part which is integrally molded with the body of the device so that the tongue can be snap fastened to the body of the device to form the belt loop.

33. The carrying device of claim 32 wherein the part of the snap fastener integrally molded in the tongue comprises an eyelet and the coacting part of the snap fastener integrally molded with the body of the device comprises a projecting dome having an expanded head over which the eyelet can be snap fitted.

34. The carrying device of claim 25 wherein the carrying device comprises a drink holder for carrying a drink container.

35. A carrying device comprising:
a body having a support for carrying an article;
a flexible connector extending from an upper part of the body, the flexible connector configured to releasably connect the device to a window sill of a window opening in a vehicle door and such that it can be doubled back on itself; and
a fastener, the fastener connecting the connector to the body, for forming a belt loop for alternatively supporting the device from a user's belt.

* * * * *

UNITED STATES PATENT AND TRADEMARK OFFICE
CERTIFICATE OF CORRECTION

PATENT NO.  : 5,361,950
DATED       : November 8, 1994
INVENTOR(S) : Noel W. Signal et al.

It is certified that error appears in the above-indentified patent and that said Letters Patent is hereby corrected as shown below:

Col. 9, line 2,

In Claim 24, line 5, delete "expanding" and substitute --expanded--.

Signed and Sealed this

Sixteenth Day of May, 1995

Attest:

BRUCE LEHMAN

Attesting Officer

Commissioner of Patents and Trademarks